(12) United States Patent
Xu et al.

(10) Patent No.: US 7,862,085 B2
(45) Date of Patent: Jan. 4, 2011

(54) THREE-DIMENSIONAL VEHICLE FRAME

(75) Inventors: Weizhang S. Xu, Troy, MI (US); John K. Catterall, Troy, MI (US); Zhijun Zheng, Avon, CT (US); Rajan R. Chakravarty, Wixom, MI (US); Vesna Savic, Sterling Heights, MI (US); Yul Woong Hyun, Troy, MI (US); Donald R. Jones, Troy, MI (US); Gary M. Banasiak, Troy, MI (US); Arun M. Joshi, Troy, MI (US); Ronald Kurtz, Whitby (CA)

(73) Assignee: GM Global Technologies Operations, Inc., Detroit, MI (US)

( * ) Notice: Subject to any disclaimer, the term of this patent is extended or adjusted under 35 U.S.C. 154(b) by 1008 days.

(21) Appl. No.: 11/563,930

(22) Filed: Nov. 28, 2006

(65) Prior Publication Data

US 2008/0122213 A1    May 29, 2008

(51) Int. Cl.
*B62D 21/00* (2006.01)
*B62D 21/02* (2006.01)

(52) U.S. Cl. .............. 280/800; 280/781; 296/204

(58) Field of Classification Search .......... 280/781, 280/790, 797, 798, 799, 800; 180/311; 296/204, 296/35.1
See application file for complete search history.

(56) References Cited

U.S. PATENT DOCUMENTS

| | | | | |
|---|---|---|---|---|
| 1,653,419 A * | 12/1927 | Staley | .................. | 280/800 |
| 2,322,841 A | 6/1943 | Foster | | |
| D149,830 S * | 6/1948 | Nelson | ............... | D12/159 |
| 3,264,010 A * | 8/1966 | Pierce | ................. | 280/792 |
| 3,912,295 A * | 10/1975 | Eggert, Jr. | .............. | 280/784 |
| 4,732,819 A * | 3/1988 | Komuro | ................ | 428/582 |
| 4,811,812 A * | 3/1989 | Cassese | ................ | 180/295 |
| 4,811,970 A * | 3/1989 | Cassese | ................ | 280/788 |
| 4,869,539 A * | 9/1989 | Cassese | ................ | 280/781 |
| 4,907,735 A * | 3/1990 | Ushioda et al. | ......... | 228/173.4 |
| 4,951,964 A | 8/1990 | Sakamoto et al. | | |
| 4,958,844 A * | 9/1990 | Hancock | ............... | 280/785 |
| 5,308,115 A * | 5/1994 | Ruehl et al. | ............. | 280/785 |
| 5,507,522 A * | 4/1996 | Ritchie | ................. | 280/800 |
| 5,833,269 A * | 11/1998 | Gastesi | ................. | 280/785 |
| 5,855,394 A * | 1/1999 | Horton et al. | ........... | 280/781 |
| 6,003,898 A * | 12/1999 | Teply et al. | ............. | 280/785 |
| 6,189,930 B1 * | 2/2001 | Kalazny | ................ | 280/781 |
| 6,299,210 B1 * | 10/2001 | Ruehl et al. | ............. | 280/800 |
| 6,733,040 B1 * | 5/2004 | Simboli | ................ | 280/800 |
| 7,543,384 B2 * | 6/2009 | Ni et al. | ................. | 29/897.2 |
| 2002/0163173 A1 * | 11/2002 | Ruehl et al. | ............. | 280/781 |

(Continued)

FOREIGN PATENT DOCUMENTS

DE        931513 B       8/1955

(Continued)

*Primary Examiner*—Toan C To
*Assistant Examiner*—George D. Spisich
(74) *Attorney, Agent, or Firm*—Quinn Law Group, PLLC

(57) ABSTRACT

A vehicle frame includes first and second lower rails and first and second upper rails operatively interconnected. Cross members horizontally interconnect the lower rails and the upper rails, and stanchions vertically interconnect the upper rails and the lower rails. The frame provides improved stiffness and strength at a reduced mass compared to the prior art.

7 Claims, 3 Drawing Sheets

U.S. PATENT DOCUMENTS

| | | |
|---|---|---|
| 2003/0038469 A1* | 2/2003 | Chernoff et al. ............ 280/781 |
| 2003/0178834 A1* | 9/2003 | Grimm et al. ............... 280/781 |
| 2005/0046165 A1* | 3/2005 | Gomi et al. ................. 280/781 |
| 2006/0055162 A1* | 3/2006 | Beckmann et al. .......... 280/781 |
| 2006/0208534 A1 | 9/2006 | Regnell et al. |

FOREIGN PATENT DOCUMENTS

| | | |
|---|---|---|
| DE | 1430191 A | 5/1969 |
| DE | 2117414 | 10/1972 |
| DE | 2714017 A1 | 10/1978 |
| DE | 3151280 A1 | 7/1983 |
| DE | 3613607 A1 | 11/1986 |
| DE | 3904723 C2 | 2/1993 |
| DE | 10158107 C1 | 2/2003 |
| DE | 10227635 A1 | 1/2004 |
| EP | 1281602 A2 | 2/2003 |
| EP | 1318064 A2 | 6/2003 |
| FR | 659850 A | 7/1929 |
| GB | 1337555 | 11/1973 |

\* cited by examiner

THREE-DIMENSIONAL VEHICLE FRAME

TECHNICAL FIELD

This invention relates to vehicle chassis frames having two upper rails and two lower rails.

BACKGROUND OF THE INVENTION

Vehicles are typically characterized by one of two types of construction, namely body-on-frame construction and unibody construction, which is also sometimes referred to as body-frame integral construction. As understood by those skilled in the art, the vehicle body and the vehicle frame are the same in unibody construction; that is, the body forms the frame. With body-on-frame construction, a body is mounted to a separate chassis frame.

Prior art chassis frames are referred to as "ladder frames" because they comprise two longitudinally-oriented rails that extend substantially the length of the body to which the frame is attached, and two or more transversely-oriented cross members that rigidly interconnect the two rails.

SUMMARY OF THE INVENTION

A vehicle frame is provided. The vehicle frame includes first and second lower rails being horizontally spaced from one another, and first and second upper rails being horizontally spaced from one another and vertically spaced from the first and second lower rails. At least one lower cross member interconnects the first and second lower rails, and at least one upper cross member interconnects the first and second upper rails.

In an exemplary embodiment, a plurality of stanchions vertically interconnects the first lower rail and the first upper rail, and a plurality of stanchions vertically interconnects the second lower rail and the second upper rail. Shear webs interconnect the upper and lower rails to provide torsional rigidity and, in the event of an impact, absorb energy and stabilize the upper and lower rails.

Since the global bending stiffness of a frame is related to the total rail section height, with the new upper and lower rail frame design of the present invention, especially with the lower rails being routed under the chassis axles, the rail section height is substantially increased, leading to a higher bending stiffness. External loads can be channeled through both upper rails and lower rails, thus providing energy absorption. The upper and lower rails also provide structural stability to the frame under external loading. The frame of the invention allows the use of low gauge, or thinner gauge, metal, such as equal to or less than 3.0 millimeters, for the components of the frame, resulting in a lower weight for the frame. The lower rails also provide flexibility in cross member placement, and thus provide the opportunity to align cross members with anticipated external load paths.

The frame of the invention also provides enhanced global frequencies, including bending, torsion, and lateral bending; the frame also provides enhanced global stiffness, including global bending, global twist, and global matchboxing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
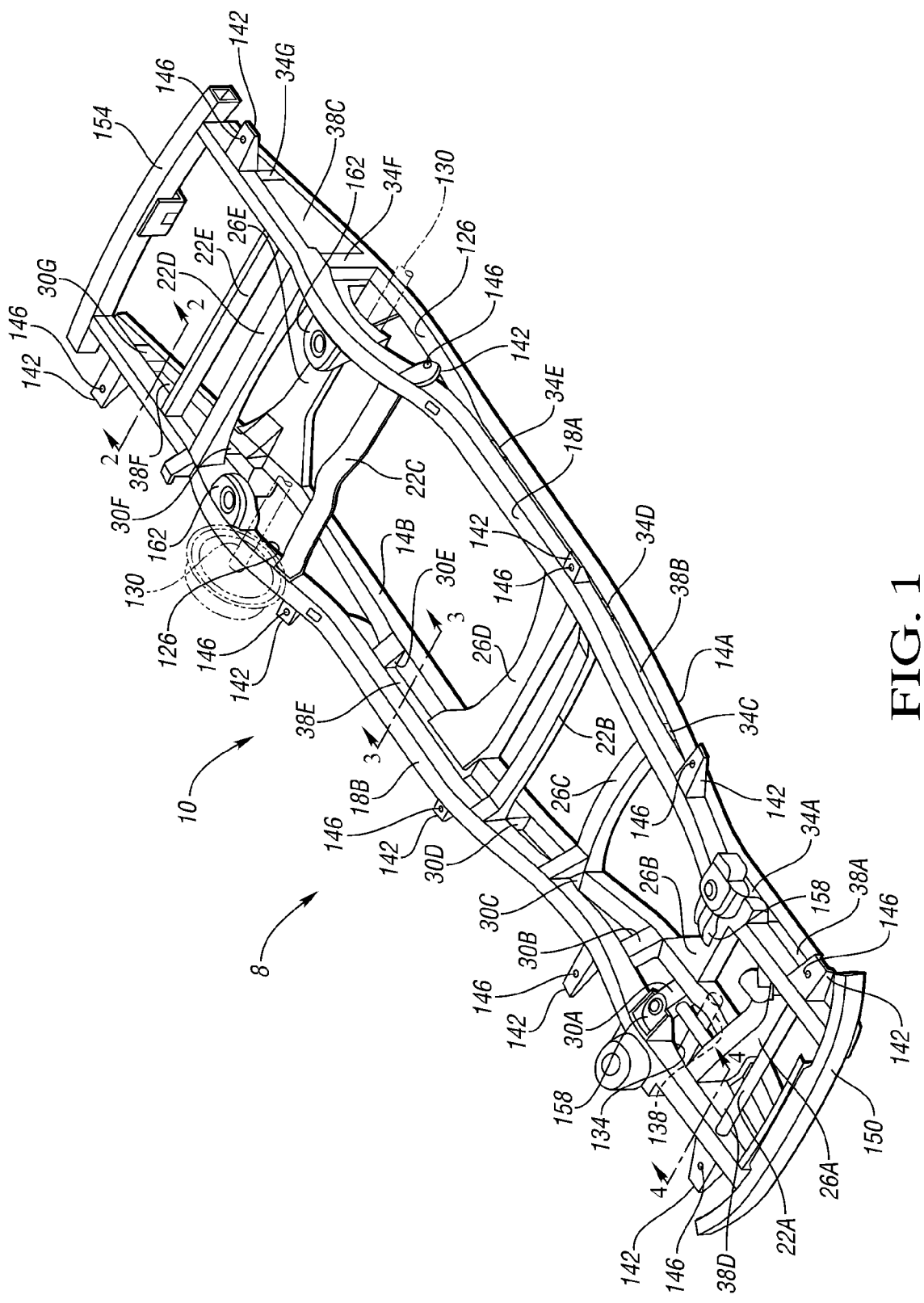
FIG. 1 is a schematic, perspective view of a vehicle chassis including a frame in accordance with the claimed invention.

Referring to FIG. 1, a vehicle chassis 8 is schematically depicted. The vehicle chassis 8 includes a frame 10. The frame 10 includes two lower rails 14A, 14B that are longitudinally-oriented with respect to the frame 10, and two upper rails 18A, 18B that are longitudinally-oriented with respect to the frame 10. The two lower rails 14A, 14B are horizontally spaced from one another, and the two upper rails 18A, 18B are horizontally spaced from one another. The upper rails 18A, 18B are vertically spaced from the lower rails 14A, 14B. Those skilled in the art will recognize a variety of methods that may be used to form the rails 14A, 14B, 18A, 18B within the scope of the claimed invention, such as stamping, tube hydro-forming, roll forming, etc.

The frame 10 further includes a plurality of upper cross members 22A-E that extend transversely between the upper rails 18A, 18B. More specifically, one end of each cross member 22A-E is connected to upper rail 18A, and one end of each cross member 22A-E is connected to upper rail 18B to substantially rigidly connect the two upper rails 18A, 18B. Those skilled in the art will recognize a variety of methods and devices that may be employed to connect frame members together, such as welding, mechanical fasteners such as bolts, adhesive bonding, etc.

The frame 10 also includes a plurality of lower cross members 26A-E that extend transversely between the lower rails 14A, 14B. More specifically, one end of each cross member 26A-E is connected to lower rail 14A, and one end of each cross member 26A-E is connected to lower rail 14B to substantially rigidly connect the two lower rails 14A, 14B.

The frame 10 includes substantially vertical stanchions 30A-G, 34A, 34C-G to connect the upper rails and the lower rails, and to provide torsional rigidity to the frame 10. Each of stanchions 30A-G is rigidly connected at one end to lower rail 14B and is rigidly connected at the other end to upper rail 18B to interconnect lower rail 14B and upper rail 18B. Stanchions 34A, 34C-G similarly interconnect lower rail 14A and upper rail 18A. Exemplary stanchions include hollow tubular members. It should be noted that the frame 10 is symmetrical about a vertical plane extending longitudinally at the centerline of the frame 10.

Figure 2:
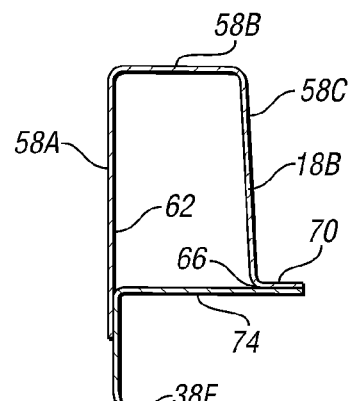
FIG. 2 is a schematic, cross-sectional view of an upper and lower rail of the frame of FIG. 1.

Shear webs 38A-C interconnect lower rail 14A and upper rail 18A. Similarly, shear webs 38D-F interconnect lower rail 14B and upper rail 18B. FIG. 2, wherein like reference numbers refer to like components from FIG. 1, is a schematic cross-sectional view of lower rail 14B, upper rail 18B, and shear web 38F taken about a vertical plane rearward of stanchion 30F. Referring to FIG. 2, lower rail 14B defines three walls 42A, 42B, 42C that cooperate to define a cavity 46 that is upwardly open. That is, lower rail 14A defines an opening 50 to cavity 46. The lower rail 14B also defines a weld flange 54 that extends at a right angle from wall 42C adjacent the opening 50 to cavity 46.

Upper rail 18B defines three walls 58A, 58B, 58C that cooperate to define a cavity 62 that is downwardly open. That is, upper rail 18B defines an opening 66 to cavity 62. The upper rail 18B also defines a weld flange 70 that extends at a right angle from wall 58C adjacent the opening 66 to cavity 62.

Shear web 38F, like the other shear webs, is a single piece of sheet metal that has been stamped or otherwise formed into the shape shown. More particularly, shear web 38F includes a first segment 74, a second segment 78 that is at a generally right angle from the first segment 74, and a third segment 82 that is generally at a right angle from the second segment 78. The first segment 74 is connected to the upper rail 18B at the weld flange 70 and at wall 58A, such as by spot welding, seam welding, or adhesive bonding, to extend across, and thereby close, opening 66. Thus, segment 74 of shear web 38F cooperates with the upper rail 18B to form a closed section.

Similarly, the third segment 82 is connected to the lower rail at the weld flange 54 and at wall 42A, such as by spot welding, seam welding, or adhesive bonding, to extend across, and thereby close, opening 50. Thus, segment 82 of shear web 38F cooperates with the lower rail 14B to form a closed section. The second segment 78 of the shear web interconnects the upper rail 18B and the lower rail 14B. In the embodiment depicted, segment 78 includes strengthening formations 86.

Figure 3:
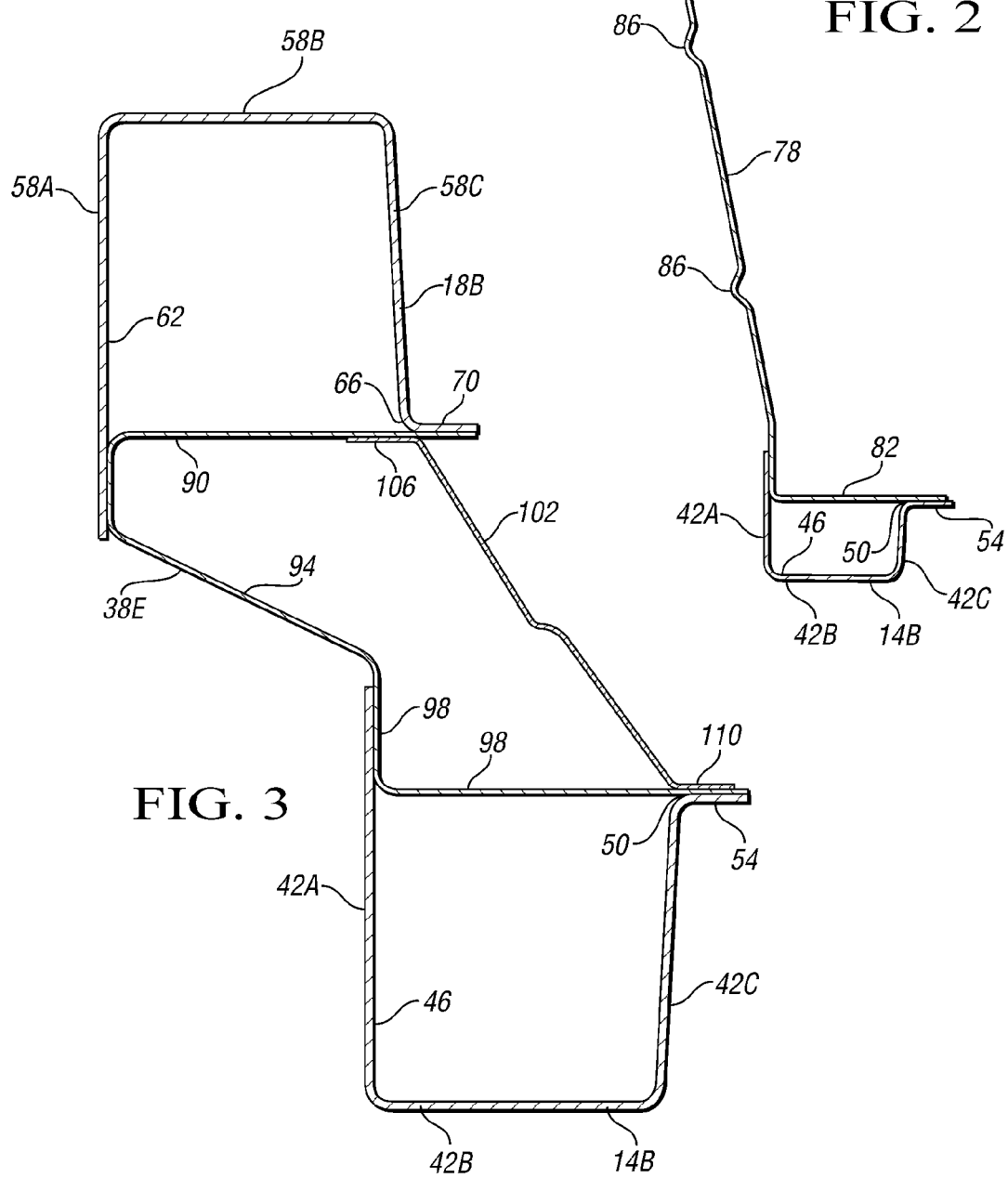
FIG. 3 is another schematic, cross-sectional view of the upper and lower rail of FIG. 2.

FIG. 3, wherein like reference numbers refer to like components from FIGS. 1 and 2, is a schematic cross-sectional view of lower rail 14B and upper rail 18B taken about a vertical plane proximate to stanchion 30E. Referring to FIG. 3, shear web 38E includes a first segment 90, a second segment 94, and a third segment 98. The first segment 90 is connected to the upper rail 18B at the weld flange 70 and at wall 58A, such as by spot welding, seam welding, or adhesive bonding, to extend across, and thereby close, opening 66. Thus, segment 90 of shear web 38E cooperates with the upper rail 18B to form a closed section.

Similarly, the third segment 98 is connected to the lower rail at the weld flange 54 and at wall 42A, such as by spot welding, seam welding, or adhesive bonding, to extend across, and thereby close, opening 50. Thus, segment 98 of shear web 38F cooperates with the lower rail 14B to form a closed section. The second segment 94 of the shear web interconnects the upper rail 18B and the lower rail 14B.

Sections of the frame may include two shear webs. In FIG. 3, shear web 102 includes a flange 106 that is connected to segment 90 of shear web 38E, such as by welding. Flange 110 is connected to segment 98 of shear web 38E and weld flange 54.

Figure 4:
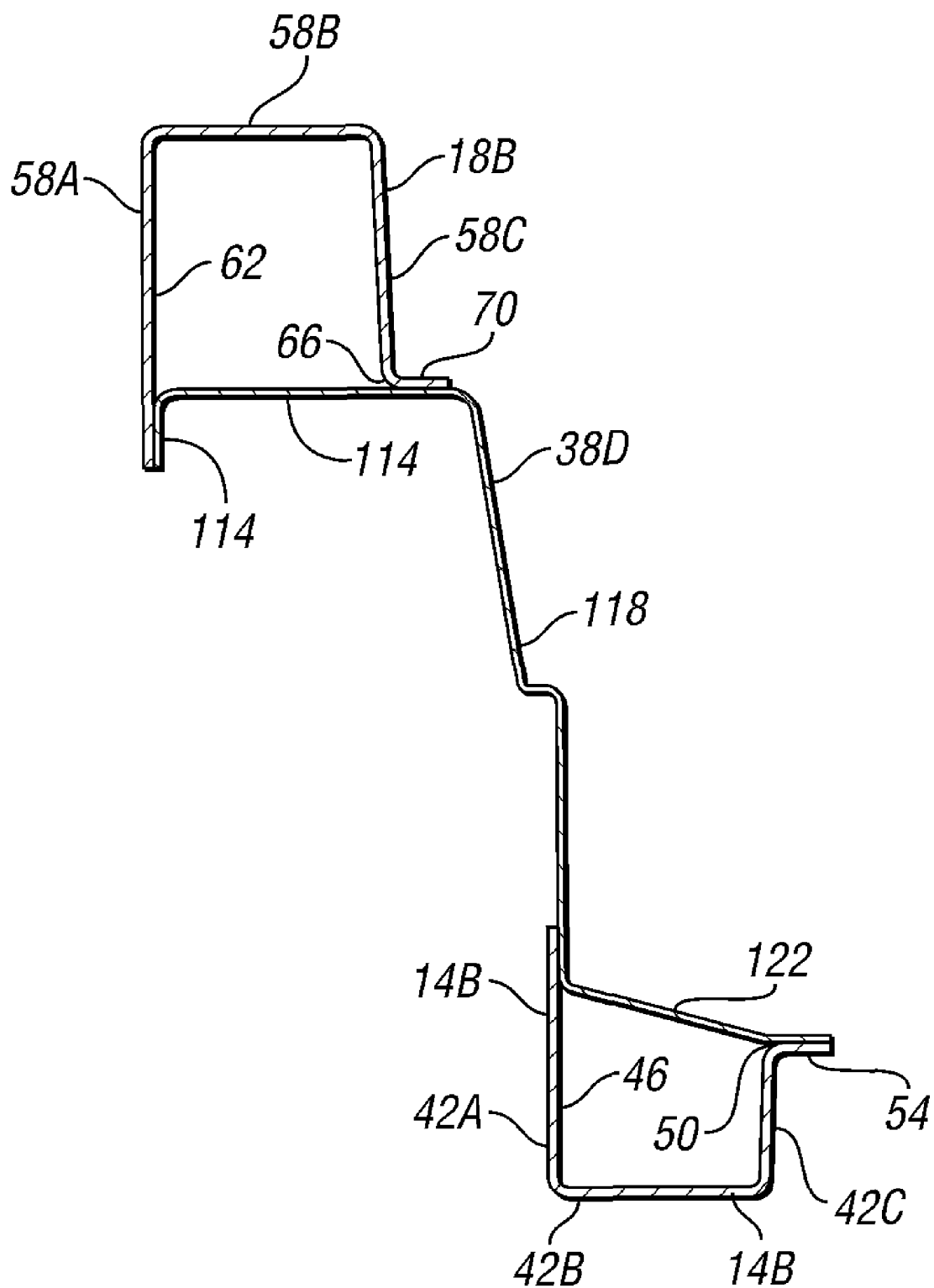
FIG. 4 is yet another schematic, cross-sectional view of the upper and lower rail of FIGS. 2 and 3.

FIG. 4, wherein like reference numbers refer to like components from FIGS. 1-3, is a schematic cross-sectional view of lower rail 14B, upper rail 18B, and shear web 38D. Referring to FIG. 4, shear web 38D includes a first segment 114, a second segment 118, and a third segment 122. The first segment 114 is connected to the upper rail 18B at the weld flange 70 and at wall 58A, such as by spot welding, seam welding, or adhesive bonding, to extend across, and thereby close, opening 66. Thus, segment 114 of shear web 38D cooperates with the upper rail 18B to form a closed section.

Similarly, the third segment 122 is connected to the lower rail at the weld flange 54 and at wall 42A, such as by spot welding, seam welding, or adhesive bonding, to extend across, and thereby close, opening 50. Thus, segment 122 of shear web 38D cooperates with the lower rail 14B to form a closed section. The second segment 118 of the shear web interconnects the upper rail 18B and the lower rail 14B.

The shear webs are configured to absorb energy and stabilize the upper and lower rails during an impact event, and are configured to provide torsional rigidity to the frame 10.

It should be noted that, although the rails in the embodiment depicted have an open cross section that is closed by a shear web, rails may be characterized by any cross-sectional shape within the scope of the claimed invention.

Referring to FIGS. 2-4, it should be noted that the upper rails 18B and lower rails 14B vary in cross-sectional geometry and size along the length of the frame. Furthermore, the vertical distance between the upper and lower rails varies along the length of the frame. Thus, for example, the cross-sectional area of the rails (or the cavities 46, 62) at the rearward and forward portions of the frame (as shown in FIGS. 2 and 4, respectively) is smaller than at the center portion of the frame, as shown in FIG. 3. The vertical distance between the upper rails 18B and the lower rails 14B is greater at the rearward portion of the frame (FIG. 2) than at the center portion of the frame (FIG. 3). The relative horizontal distance between the upper rail 18B and the lower rail 14B also varies along the length of the frame. For example, the upper rail 18B is further outboard relative to the lower rail in FIGS. 3 and 4 than in FIG. 2.

Referring again to FIG. 1, upper rail 18A and the lower rail 14A define an open space 126 therebetween through which a rear axle 130 extends. Similarly, upper rail 18B and lower rail 14B define an open space 126 therebetween through which axle 130 extends. Lower rail 14A and upper rail 18A also define an open space 134 through which a front axle 138 extends. Lower rail 14B and upper rail 18B also define an open space through which a front axle extends. The routing of the lower rails 14A, 14B under front and rear axles 130, 138 may provide front and rear impact benefits and improve global bending stiffness.

The portion of the lower rails 14A, 14B near the rear axle and cross member 26E may be made as a subassembly and bolted onto the rest of the frame 10 after installation of the axle and exhaust system (not shown). The subassembly may also be selectively removable to facilitate servicing of the axle and exhaust system.

Cross member 26D is configured to provide impact resistance for the passenger compartment of a body (not shown) attached to the chassis 8. Cross members 26D, 26E provide additional torsional and bending stiffness for the frame 10.

Body mounts 142 are brackets each with a respective hole 146. The body mounts 142 are mounted to the upper rails 18A, 18B for marrying a body (not shown) to the chassis 8 as understood by those skilled in the art. The frame 10 in accordance with the invention may enable the reduction of the quantity of body mounts employed. For example, the frame 10 of the embodiment depicted employs ten body mounts instead of the typical twelve body mounts.

A front bumper beam 150 is mounted to the upper rails 18A, 18B at the forward end of the frame 10. A rear bumper beam 154 is mounted to the upper rails 18A, 18B at the rearward end of the frame 10. Front and rear suspension brackets 158, 162 are mounted to the upper rails 18A, 18B.

It may be desirable for members of the frame 10, such as the rails, stanchions, cross members, etc., to comprise high-strength steel. Holes may be formed in the shear webs, rails, and cross members for weight reduction, weld access, and paint and coating drainage. Beads and indentations may also be formed in members of the frame 10 for local stiffening or for initiating deformation in an impact event. Exemplary joints for joining members of the frame 10 are described in U.S. Pat. No. 6,402,414, issued Jun. 11, 2002 to Kanodia, et al., which is hereby incorporated by reference in its entirety.

While the best modes for carrying out the invention have been described in detail, those familiar with the art to which this invention relates will recognize various alternative designs and embodiments for practicing the invention within the scope of the appended claims.

The invention claimed is:

1. A vehicle chassis frame comprising:
   a first lower rail;
   a second lower rail being spaced horizontally from the first lower rail;
   a first upper rail being vertically spaced from the first and second lower rails; and
   a second upper rail being vertically spaced from the first and second lower rails and being horizontally spaced from the first upper rail;
   at least one lower cross member interconnecting the first and second lower rails;
   at least one upper cross member interconnecting the first and second upper rails; and
   a shear web interconnecting the first lower rail and the first upper rail;
   wherein said shear web is a single piece of formed sheet metal;
   wherein the first lower rail defines a first cavity characterized by a first opening;
   wherein the first upper rail defines a second cavity characterized by a second opening;
   wherein the shear web has first, second, and third segments; wherein the first segment of the shear web is connected to the first upper rail such that the first segment extends substantially horizontally across the second opening; wherein the third segment of the shear web is connected to the first lower rail such the third segment extends substantially horizontally across the first opening; and wherein the second segment interconnects the first and third segments.

2. The frame of claim 1, further comprising a first plurality of stanchions each interconnecting the first lower rail and the first upper rail, and a second plurality of stanchions each interconnecting the second lower rail and the second upper rail.

3. The frame of claim 1, wherein the frame is characterized by a first open space between the first lower rail and the first upper rail to accommodate a front axle; and wherein the frame is characterized by a second open space between the first lower rail and the first upper rail to accommodate a rear axle.

4. A vehicle chassis comprising:
   a frame including first and second lower rails being horizontally spaced from one another, first and second upper rails being horizontally spaced from one another and vertically spaced from the first and second lower rails, at least one lower cross member interconnecting the first and second lower rails, and at least one upper cross member interconnecting the first and second upper rails;
   said first lower rail and said first upper rail defining a first open space therebetween; said first lower rail and said first upper rail defining a second open space therebetween;
   a front axle in the first open space between the first upper rail and the first lower rail;
   a rear axle in the second open space between the first upper rail and the first lower rail; and
   a shear web interconnecting the first lower rail and the first upper rail;
   wherein the first lower rail defines a first cavity characterized by a first opening;
   wherein the first upper rail defines a second cavity characterized by a second opening;
   wherein the shear web is a single piece of sheet metal formed to have first, second, and third segments; wherein the first segment of the shear web is connected to the first upper rail such that the first segment closes the second opening; wherein the third segment of the shear web is connected to the first lower rail such the third segment closes the first opening; and wherein the second segment interconnects the first and third segments.

5. The vehicle chassis of claim 4, wherein said first lower rail is directly below, and in vertical alignment with, the rear axle.

6. The vehicle chassis of claim 4, further comprising a first plurality of stanchions each interconnecting the first lower rail and the first upper rail, and a second plurality of stanchions each interconnecting the second lower rail and the second upper rail.

7. The vehicle chassis of claim 4, further comprising a plurality of body mounts being operatively connected to said frame and at which a vehicle body is operatively connectable to the vehicle chassis.

* * * * *